United States Patent
Kadono et al.

(10) Patent No.: US 11,755,652 B2
(45) Date of Patent: Sep. 12, 2023

(54) INFORMATION-PROCESSING DEVICE AND INFORMATION-PROCESSING METHOD

(71) Applicant: NTT DOCOMO, INC., Tokyo (JP)

(72) Inventors: Kousuke Kadono, Tokyo (JP); Yuuki Saitou, Tokyo (JP); Youhei Oono, Tokyo (JP); Yuichiro Segawa, Toyko (JP)

(73) Assignee: NTT DOCOMO, INC., Tokyo (JP)

( * ) Notice: Subject to any disclaimer, the term of this patent is extended or adjusted under 35 U.S.C. 154(b) by 243 days.

(21) Appl. No.: 16/647,684

(22) PCT Filed: Nov. 20, 2018

(86) PCT No.: PCT/JP2018/042885
§ 371 (c)(1),
(2) Date: Mar. 16, 2020

(87) PCT Pub. No.: WO2019/103007
PCT Pub. Date: May 31, 2019

(65) Prior Publication Data
US 2021/0248189 A1 Aug. 12, 2021

(30) Foreign Application Priority Data
Nov. 24, 2017 (JP) .................. 2017-225815

(51) Int. Cl.
| G10L 15/22 | (2006.01) |
| G10L 15/20 | (2006.01) |
| G06F 16/9032 | (2019.01) |
| G06F 3/16 | (2006.01) |

(52) U.S. Cl.
CPC ........ *G06F 16/90332* (2019.01); *G06F 3/167* (2013.01); *G10L 15/22* (2013.01); *G10L 2015/223* (2013.01)

(58) Field of Classification Search
CPC ............................. G10L 15/22; G10L 15/20
USPC .................................................. 704/231, 251
See application file for complete search history.

(56) References Cited

U.S. PATENT DOCUMENTS

2002/0052913 A1   5/2002  Yamada et al.

FOREIGN PATENT DOCUMENTS

| JP | 20000194386 A | 7/2000 |
| JP | 2002163054 A | 6/2002 |
| WO | 2008150003 A1 | 12/2008 |

OTHER PUBLICATIONS

International Search Report issued in corresponding PCT Application No. PCT/JP2018/042885, dated Jan. 18, 2019, 3 pages.
Notice of Reasons for Refusal issued in corresponding Japanese Patent Application No. 2019-555315, dated Mar. 2, 2021.

*Primary Examiner* — George C Monikang
(74) *Attorney, Agent, or Firm* — DILWORTH IP, LLC

(57) ABSTRACT

An information-processing device including an acquisition unit that acquires input data corresponding to spoken words input to a user terminal, and acquired response data output from a dialog processing device that performs processing according to the input data. A generation unit generates guidance information on how to use the dialog processing device based on the input data and the response data. An output unit outputs the guidance information generated by the generation unit to the user terminal.

18 Claims, 2 Drawing Sheets

INFORMATION-PROCESSING DEVICE AND INFORMATION-PROCESSING METHOD

TECHNICAL FIELD

The present invention relates to a technique for performing processing according to voice.

BACKGROUND

With recent improvements in speech recognition technology, services that enable users to vocally initiate different types of processing have become widely available. For example, Publication No. WO 2008/150003 A1 discloses a system in which a front-end device receives a keyword input by keyboard or mouse while inputting voice data to an associated system, and identifies a keyword present in the voice data.

SUMMARY OF INVENTION

A user who is unaccustomed to using such a service may encounter difficulties in causing a dialog processing device to carry out desired processing. However, pre-installing into the dialog processing device comprehensive guidance information for such a user would involve significant cost. Accordingly, the present invention is directed to generating guidance information on how to use a dialog processing device and presenting it to a user.

To solve the problem, the present invention provides an information-processing device comprising: an acquisition unit configured to acquire input data corresponding to spoken words input to a user terminal, and response data output from one or more dialog processing devices that perform processing according to the input data; a generation unit configured to generate guidance information on how to use the one or more dialog processing devices, on the basis of the input data and the response data; and an output unit configured to output the guidance information generated by the generation unit to the user terminal.

The generation unit may be configured to determine a type of a set of the input data and the response data, and to generate the guidance information based on the type.

The generation unit may be configured to generate the guidance information on the basis of the response data, wherein the response data is data relating to an error.

The generation unit may be configured to generate the guidance information on the basis of the input data, wherein the input data has a predetermined level of similarity to response data relating to an error, and does not trigger output of response data relating to the error.

The generation unit may be configured, upon detecting that a predetermined number or more of items of the response data on the error has been output in response to the input data, to generate the guidance information on the basis of the response data relating to the error.

The generation unit may be configured to generate the guidance information on the basis of a number of exchanges made after the spoken words are input to the user terminal until the one or more dialog processing devices perform the processing, wherein an exchange corresponds to a set of the input data and the response data.

The generation unit may be configured to generate the guidance information on the basis of input by the user of the user terminal or a group to which the user belongs, and the output unit may be configured to output the guidance information that corresponds to the user of the user terminal or the group to which the user belongs, to the user terminal.

The output unit may be further configured to specify whether the guidance information should be displayed or output as sound, based on content of the guidance information, and to output the guidance information to the user terminal, together with an instruction to output the guidance information using the specified output method.

The output unit may be further configured to determine whether it is necessary to output the guidance information, and upon determining that it is necessary to output the guidance information, to output the guidance information to the user terminal.

The present invention also provides an information-processing method comprising: acquiring input data corresponding to spoken words input to a user terminal, and response data output from one or more dialog processing devices that perform processing according to the input data; generating guidance information on how to use the one or more dialog processing devices, on the basis of the input data and the response data; and outputting the guidance information generated by the generation unit to the user terminal.

The present invention makes it possible to easily generate guidance information on how to use a dialog processing device and present it to a user.

Figure 1:
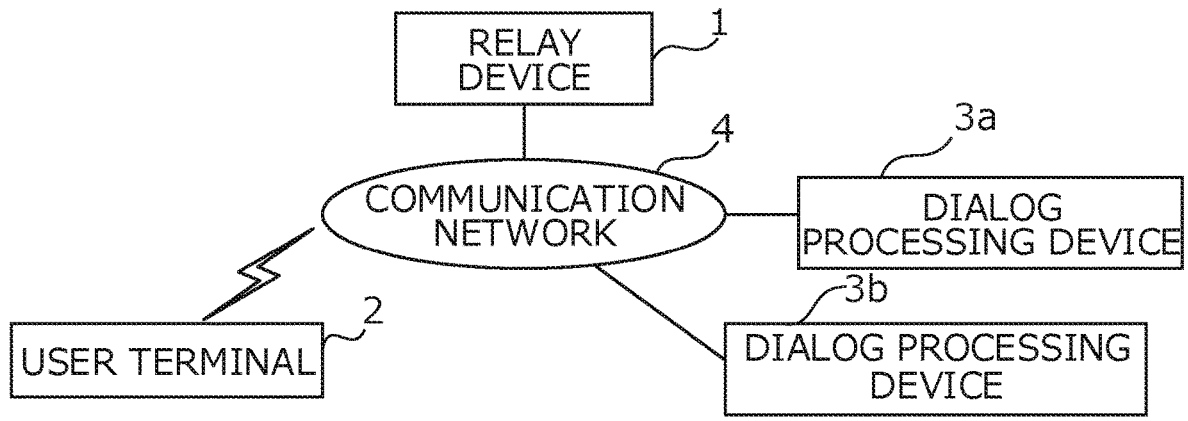
FIG. 1 is a diagram showing a configuration of a dialog processing system according to an embodiment of the present invention, in accordance to the present invention.

REFERENCE SIGNS LIST 1 relay device
101 control unit
102 communication unit
103 storage unit
11 acquisition unit
12 generation unit
13 output unit
2 user terminal
3a, 3b dialog processing device
4 communication network Detailed Description The following describes an embodiment of the present invention with references to the drawings.

FIG. 1 is a block diagram showing a configuration of a dialog processing system according to an embodiment of the present invention. The dialog processing system includes: relay device 1, which is an example of an information-processing device according to the present invention; user terminal 2, for use by a speech user; dialog processing devices 3a and 3b, each of which is able to recognize words spoken by the user, and perform processing according to the recognized words (hereafter, referred to as "dialog processing function"); and communication network 4, which enables relay device 1, user terminal 2, and dialog processing device 3a and 3b to communicate with each other. User terminal 2 may be a portable computer such as a smartphone or a tablet, or a stationary computer provided at a user's home. Communication network 4 may be a mobile communication network or a fixed communication network. User terminal 2 may connect wirelessly to the mobile communication network. In FIG. 1, two dialog processing devices 3a and 3b are shown; however, a number of dialog processing devices is not limited to two, and may be one or more. The number of user terminals 2 also is not limited to one. In the following description, dialog processing devices 3a and 3b are referred to collectively as dialog processing device 3.

Dialog processing devices 3a and 3b are each computers operated and managed by different operators. For example, dialog processing device 3a may be a device that enables a user to order a pizza delivery by voice; and dialog processing device 3b may be a device that enables a user to order daily necessities and other goods by voice. Each of dialog processing devices 3a and 3b has determined rules that should be followed by the user who inputs a voice instruction. The determined rules are hereafter referred to as input rules. For example, dialog processing device 3a enables delivery of pizzas having specified names, and dialog processing device 3b enable order of daily necessities having specified product names. Correctly pronouncing a pizza name or product name for input to dialog processing device 3a or 3b corresponds to the input rule.

Relay device 1 is a computer that relays data between user terminal 2 and dialog processing device 3a or 3b. Relay device 1 functions as a platform. Relay device 1 receives data input by user terminal 2 and data output by dialog processing device 3a or 3b to generate guidance information on how to use dialog processing device 3a or 3b, and present the guidance information to a user. The content of guidance information depends on an input rule for dialog processing device 3a or 3b; accordingly, guidance information differ for each of the dialog processing devices 3a and 3b.

Figure 2:
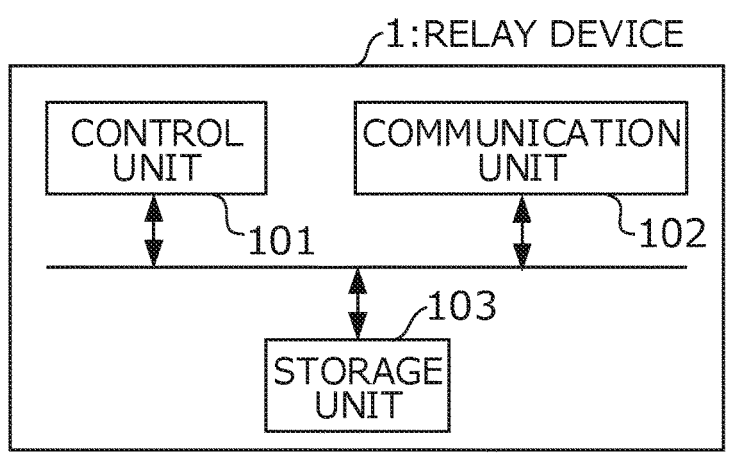
FIG. 2 is a diagram showing a hardware configuration of a relay device according to the embodiment, in accordance to the present invention.

FIG. 2 is a block diagram showing a hardware configuration of relay device 1, which includes control unit 101, communication unit 102, and storage unit 103. Control unit 101 includes a processor such as a central processing unit (CPU) and a storage device such as a read only memory (ROM) and a random access memory (RAM). The CPU executes a program stored in the ROM or storage unit 103 while using the RAM as a work area, to control components of relay device 1.

Communication unit 102 is hardware (a transmitting and receiving device) for enabling communication between computers via wired and/or wireless network(s). Communication unit 102 may be referred to as a network device, a network controller, a network card, or a communication module. Communication unit 102 connects to communication network 4.

Storage unit 103 is a computer-readable recording medium, and, for example, includes at least one of an optical disk such as a compact disc ROM (CD-ROM), a hard disk drive, a flexible disk, and a magneto-optical disk (for example, a compact disk, a digital versatile disk, a Blu-ray (registered trademark) disk), a smart card, a flash memory (for example, a card, a stick, a key drive), a floppy (registered trademark) disk, and a magnetic strip. Storage unit 103 may be referred to as an auxiliary storage device. Storage unit 103 stores data and programs for use by control unit 101.

Figure 3:
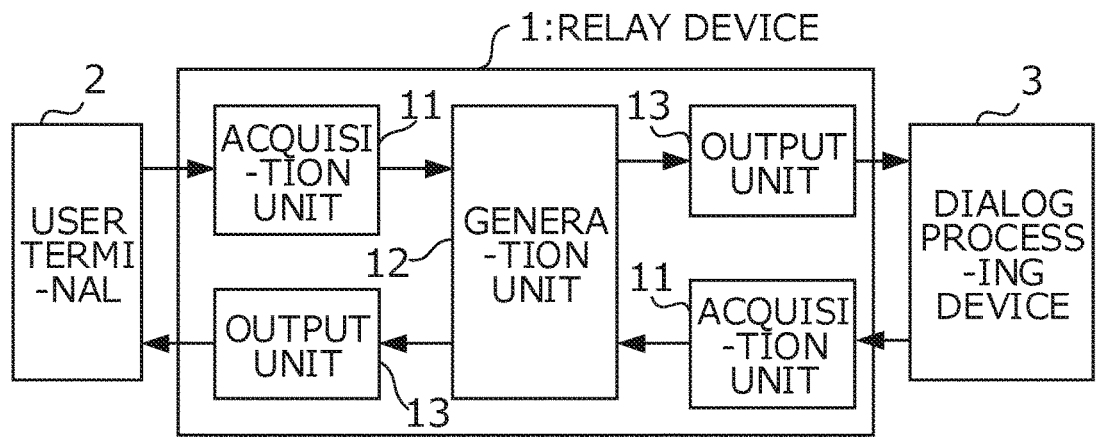
FIG. 3 is a diagram showing a functional configuration of the relay device, in accordance with the present invention.

FIG. 3 is a block diagram showing a functional configuration of relay device 1, which includes acquisition unit 11 and output unit 13, which are mainly realized by communication unit 102, and generation unit 12, which is mainly realized by control unit 101 and storage unit 103.

User terminal 2 includes a microphone that picks up the user's voice and generates corresponding input data. User terminal 2 sends the generated input data to relay device 1 via communication network 4. The input data may refer to text data into which voice data representing the user's voice has been converted by user terminal 2. Alternatively, the input data may refer to voice data that represents the user's voice, or data generated by performing processing on the voice data in user terminal 2. Acquisition unit 11 of relay device 1 acquires the input data input to user terminal 2, via communication network 4, and acquires response data sent from dialog processing device 3 in response to the input data, via communication network 4. The response data may refer to text data or voice data as in the case of the input data.

Generation unit 12 generates guidance information on how to use dialog processing device 3, on the basis of an acquired set of input data and corresponding response data. Specifically, generation unit 12 determines a type of the set of input data and corresponding response data, and generates the guidance information based on the type. The categorization is based on a type of processing performed according to a voice instruction, or a type of a function activated by a voice instruction. The set of input data and corresponding response data may be categorized, for example, as an "order type," an "information provision type," or a "home appliance control type," which types will be described in detail later.

Output unit 13 outputs guidance information generated by generation unit 12 to user terminal 2. Output unit 13 also outputs input data acquired from user terminal 2 to dialog processing device 3. In a case where the acquired input data is voice data, output unit 13 converts the voice data into text data, and outputs the text data to the dialog processing device 3. Also, output unit 13 outputs response data sent from the dialog processing device 3 to user terminal 2 via communication network 4. The response data may refer to text data or voice data. User terminal 2 is provided with a speaker that outputs sound according to guidance information or the response data.

Figure 4:
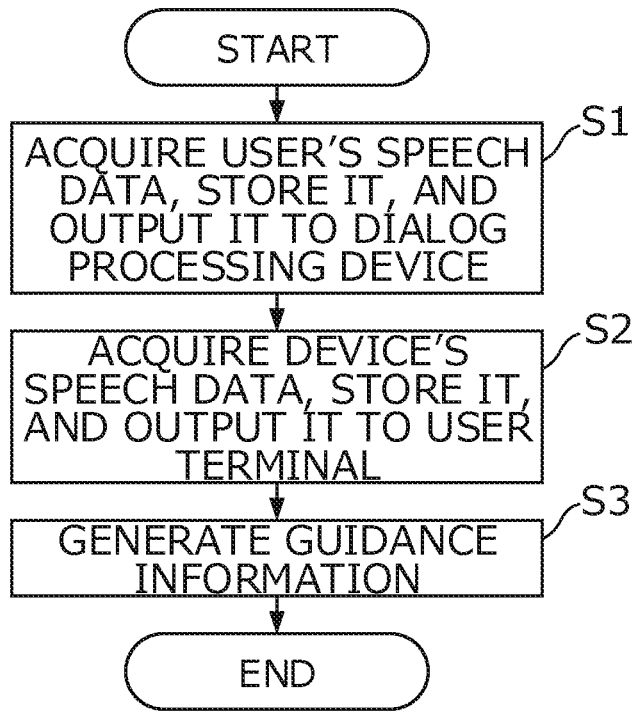
FIG. 4 is a flowchart showing processing of the relay device, in accordance with the present invention.

An operation of the present embodiment will now be described with reference to FIGS. 4 and 5. Initially, an operation of generating guidance information performed by relay device 1 is described. The user of user terminal 2 utters a predetermined keyword to activate the dialog processing function. When detecting the uttered keyword, user terminal 2 activates the dialog processing function. Subsequently, the user designates one of dialog processing devices 3 and utters words indicative of desired processing. Acquisition unit 11 of relay device 1 acquires input data corresponding to the words input to user terminal 2, via communication network 4, and stores the input data. Output unit 13 outputs the input data to the designated dialog processing device 3 via communication network 4 (step S1). The dialog processing device 3 sends response data to relay device 1 in response to the input data. Acquisition unit 11 acquires the response data via communication network 4 and stores the response data. Output unit 13 outputs the response data to user terminal 2 via communication network 4 (step S2). Generation unit 12 generates guidance information on how to use the dialog processing device 3, on the basis of the input data stored at step S1 and the response data stored at step S2 (step S3).

Now, examples of guidance information are described. As described above, a set of input data and response data is categorized, for example, as an order type, an information provision type, or a home appliance control type. First, the order type is described. It is assumed that words uttered by the user (hereinafter referred to as user's spoken words) are "A XX pizza please.," and response data sent from the dialog processing device 3 (hereinafter referred to as device's spoken words) indicates "I accepted your order." Generation unit 12 subjects this conversation to natural language analysis including morphological analysis, syntax analysis, semantic analysis, and context analysis, thereby determining that the conversation corresponds to the order type in which the user places an order for a product or service and dialog processing device 3 accepts and process the order. For the order type, template-based guidance information such as "You can order XX using the dialog processing function." or "You can buy XX using the dialog processing function." is generated. In the examples of guidance information, the word "XX" is replaced with a word indicative of a category name (for example, a pizza) of a product or service that is identified by the natural language analysis.

Second, the information provision type is described. It is assumed that user's spoken words are "What time is it?," and the corresponding device's spoken words are "It's three twenty-six." Generation unit 12 subjects this conversation to natural language analysis, thereby determining that the conversation corresponds to the information provision type in which the user's spoken words form a question or an imperative sentence requesting provision of information, and the device's spoken words form a response. For the information provision type, template-based guidance information such as "The dialog processing function can answer your question." is generated.

Another case is assumed in which user's spoken words are "What is your recommendation today?," and the corresponding device's spoken words are "It's a XX pizza." Generation unit 12 subjects this conversation to natural language analysis, thereby determining that the conversation corresponds to the information provision type in which dialog processing device 3 recommends something to the user. For the present case of the information provision type, template-based guidance information such as "The dialog processing function can make a recommendation of XX." is generated. In the example of guidance information, the word "XX" is replaced with a word indicative of a category name (for example, a pizza) of a product or service that is identified by the natural language analysis.

Another case is assumed in which user's spoken words are "Tell me about XX.," and the user's spoken words are answered with the corresponding device's spoken words "I did a search on XX." Generation unit 12 subjects this conversation to natural language analysis, thereby determining that the conversation corresponds to the information provision type in which dialog processing device 3 conducts an information search. For the present case of the information provision type, template-based guidance information such as "If you say "Tell me about XX.," the dialog processing function will give you an answer." is generated.

Third, the home appliance control type is described. It is assumed that the user's spoken words are "Turn on the bathroom light.," and the corresponding device's spoken words are "I turned on the light." Generation unit 12 subjects this conversation to natural language analysis, thereby determining that the conversation corresponds to the home appliance control type in which the user's spoken words correspond to a control instruction, and the device's spoken words correspond to a completion response to the control instruction. For the home appliance control type, template-based guidance information such as "You can control XX with the dialog processing function." is generated. In the example of guidance information, the word "XX" is replaced with a word indicative of a name or category name (for example, an electric light or a home appliance) of an object to be controlled that is identified by the natural language analysis.

Each time acquisition unit 11 of relay device 1 acquires input data and response data, generation or update of guidance information as illustrated in the foregoing is carried out. Generated or updated guidance information is stored in generation unit 12 in association with identification information of dialog processing device 3 and identification information of user terminal 2.

An operation of providing guidance information performed by relay device 1 will now be described. The user of user terminal 2 utters a predetermined keyword to activate the dialog processing function. When detecting the uttered keyword, user terminal 2 activates the dialog processing function. Subsequently, the user designates one of dialog processing devices 3. When doing so, the user may designate dialog processing device 3 by use of spoken words such as "pizza delivery" or "daily goods online shopping." Alternatively, the user may designate dialog processing device 3 on a list of dialog processing devices 3 that is displayed on user terminal 2. Acquisition unit 11 of relay device 1 acquires identification information of dialog processing device 3 that has been designated in the user terminal 2. When the identification information is acquired, output unit 13 determines whether it is necessary to output guidance information corresponding to the designated dialog processing device 3 (step S11). Specifically, output unit 13 determines whether guidance information is stored in generation unit 12 for the dialog processing device 3, and whether the user has used the dialog processing device 3 more times than a threshold. In a case where guidance information is not stored for the dialog processing device 3, or the user has used the dialog processing device 3 more times than the threshold, output unit 13 determines that it is not necessary to output guidance information. On the other hand, in a case where guidance information is stored for the dialog processing device 3, or the user has not used the dialog processing device 3 more times than the threshold, output unit 13 determines that it is necessary to output guidance information.

In a case where it is necessary to output guidance information (step S11; YES), output unit 13 reads guidance information from generation unit 12 (step S12) and outputs it to user terminal 2 via communication network 4 (step S13). The speaker of user terminal 2 outputs the guidance information. Hearing the guidance information, the user can know how to use the dialog processing device 3.

According to the embodiment described above, it is possible to easily generate guidance on how to use dialog processing device 3 and present it to the user.

The above embodiment may be modified as described below. The modifications described below may be implemented in combination.

A method for generating guidance information is not limited to those of the embodiment. In another example, generation unit 12 may identify response data relating to an error from among items of response data to a user's input data, and generate guidance information based on the response data relating to the error. Dialog processing device 3 may fail to recognize a user's input data or fail to find processing corresponding to the user's input data. In such a case, the dialog processing device 3 outputs an error response indicating that processing designated by the user cannot be performed. The error response may include a message such as "Please say it again.," "I cannot hear you.," or "I cannot understand it." Each time an error response is output, generation unit 12 stores input data acquired immediately before the error response is output, in association with dialog processing device 3. After collecting items of such input data, generation unit 12 generates guidance information for providing the user with a recitation of the items of input data followed by a message "This dialog processing device cannot deal with these voice inputs." Generation unit 12 may generate guidance information only for a user's input data to which an error response is output more frequently than a threshold value.

Generation unit 12 may extract a user's input data (for example, bulkogi pizza) for which no error response is output, the input data being similar to other input data (for example, pulkogi) for which an error response is output. Generation unit 12 may then generate guidance information indicative of a message "If you want to order a "pulkogi pizza," please say "pulkogi pizza," not "pulkogi,"" to prompt the user to say "pulkogi pizza" instead of "pulkogi." In summary, generation unit 12 may generate guidance information based on input data for which no response data relating to an error is output, the input data having a predetermined level of similarity to other response data relating to an error.

In some cases, input of a user's input data for which an error response is output can lead to selection of unintended processing. In such a case, the user stops talking and generation unit 12 records the exchange. Now, an example case is assumed in which after dialog processing device 3 says "I found 120 restaurants around the current location, which can be narrowed down by budget.," a user's spoken words "The budget is 3,000 yen." does not trigger a narrowing of the search; however, a user's spoken words "3,000 yen" triggers a narrowing of the search. In such a case, generation unit 12 generates guidance information indicative of an alert message "Please say only a budget amount as a condition for narrowing the search."

In the embodiment, generation unit 12 generates guidance information based on words uttered by a first user to which the guidance information is provided. In the same embodiment, generation unit 12 may generate guidance information based on words uttered by a second user who is different from the first user to which the guidance information is provided. Now, an example case is assumed in which the second user says "A XX pizza please.," and a dialog processing device 3 says "I accepted your order." Generation unit 12 subjects this conversation to natural language analysis including morphological analysis, syntax analysis, semantic analysis, and context analysis, thereby determining that the conversation corresponds to the order type in which the user places an order for a product or service and a dialog processing device 3 accepts and process the order. For this order type, template-based guidance information such as "You can order XX with the dialog processing function." or "You can buy XX with the dialog processing function." is generated for the first user different from the second user. The foregoing process may be applied to other order types such as the information provision type or the home appliance control type. In summary, generation unit 12 may generate guidance information based on a pair of input data corresponding to words spoken by another user, and corresponding response data.

Generation unit 12 may generate guidance information based on a number of exchanges made after input data is input to user terminal 2 until dialog processing device 3 completes processing. An exchange herein corresponds to a pair of input data and corresponding response data. Specifically, generation unit 12 records a number of exchanges made after input data is input to user terminal 2 until dialog processing device 3 completes processing, and presents the number of exchanges as guidance information. For example, generation unit 12 records a number of exchanges made in a flow of specification of a product (a pizza name), specification of an option (a side dish other than a pizza), input of a destination, input of payment information, and confirmation, and generates guidance information indicative of the number of exchanges. In a case where a destination and payment information is pre-registered, generation unit 12 may record a number of exchanges made for the registration, and generate guidance information indicative of the number of exchanges.

Generation unit 12 may generate guidance information on a user or on a user group basis. The user group herein refers to an office organization or a family. To enable generation unit 12 to perform such generation, user terminal 2 sends data together with its identification information and identification information of a user group to which the user of user terminal 2 belongs, whereby generation unit 12 generates guidance information based on a user of user terminal 2 or on a group to which the user belongs. Output unit 13 outputs guidance information according to a user of user terminal 2 or to a group to which the user belongs, to user terminal 2.

Output unit 13 may specify whether guidance information should be displayed or output as sound, based on the content of the guidance information. After specifying an output method, output unit 13 may output the guidance information to user terminal 2, together with an instruction to output the guidance information using the specified output method. For example, when output unit 13 determines that an amount of guidance information is large or that the guidance information can be easily understood if presented in the form of an image, output unit 13 outputs the guidance information to user terminal 2, together with an instruction to display the guidance information. When output unit 13 determines that user terminal 2 is moving at a high speed (or estimates that user terminal 2 is aboard a moving vehicle), output unit 13 outputs the guidance information to user terminal 2, together with an instruction to output the guidance information, as sound.

Figure 5:
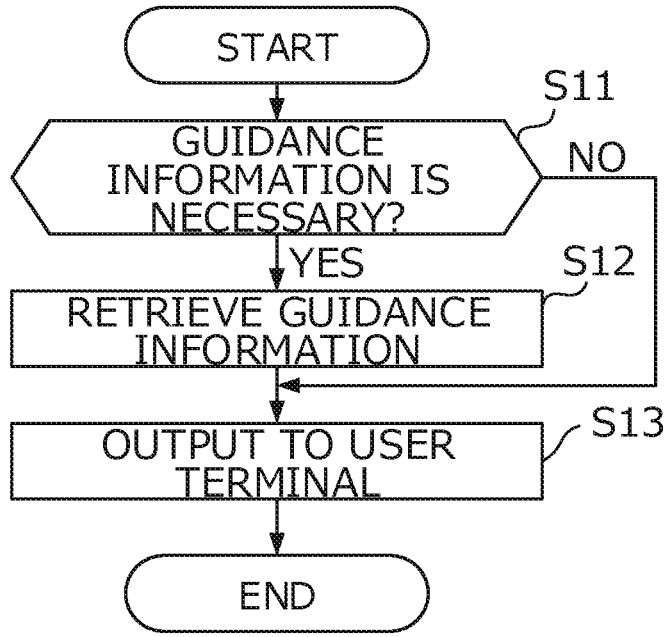
FIG. 5 is a flowchart showing processing of the relay device, in accordance with the present invention.

Output unit 13 may output guidance information at a timing different from that shown in FIG. 5. For example, output unit 13 may output guidance information after an initial set of a user's input and a response from dialog processing device 3 is completed.

Generation unit 12 may learn to which dialog processing device 3 input data is input. Specifically, in an initial stage, a user designates one of dialog processing devices 3 and utters words indicative of desired processing, and generation unit 12 learns a correspondence between the user's input data and the designated dialog processing devices 3. For example, generation unit 12 learns, for each of user terminals 2, a correspondence between input data representing "A combination pizza please," "A cheese pizza please.," or "A combination cheese pizza please," which includes a word "pizza," and dialog processing devices 3a. Generation unit 12 learns, on the basis of acquired input data and response data, one of dialog processing devices 3 to which the acquired input data is input. As the user uses this system longer, learning advances, and ultimately, the user can get his/her spoken words across to a desired dialog processing device 3, without designating the dialog processing device 3.

The block diagrams used to describe the above embodiment show blocks of functional units. The blocks of functional units may be provided using any combination of items of hardware and/or software. Means for providing the blocks of functional units are not limited. The blocks of functional units may be provided using a single device including physically and/or logically combined components, or two or more physically and/or logically separated devices that are directly and/or indirectly connected by wire and/or wirelessly.

For example, relay device 1 may refer to a single device including all of the functions shown in FIG. 3, or to a system in which all of the functions are distributed to plural devices.

In another example, relay device 1 may include at least a part of the functions of dialog processing device 3. In another example, relay device 1 may include a dedicated dialog function different from dialog processing device 3, which function enables a dialog with the user before the user starts a dialog sequence with dialog processing device 3.

The embodiments described in the present specification may be applied to a system using LTE, LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark), or another appropriate system, or to a next-generation system that is expanded based on those systems.

The order of the processes, sequence, or flowcharts in the embodiments described in the present specification may be changed as long as consistency is maintained. Methods described in the present specification include steps arranged in an exemplary order, but the steps may be arranged in another order.

The embodiments described in the present specification may be used separately or in combination, with minor changes. A notification of information (for example, a notification of "being X") may be made explicitly or implicitly.

The terms "system" and "network" used in the present specification are used interchangeably.

The term "determining" used in the present specification may refer to various actions. For example, the term "determining" may refer to judging, calculating, computing, processing, deriving, investigating, looking up (for example, looking up information in a table, a database, or a data structure), and ascertaining. The term "determining" may also refer to receiving (for example, receiving information), transmitting (for example, transmitting information), inputting, outputting, and accessing (for example, accessing data in memory). The term "determining" may also refer to resolving, selecting, choosing, establishing, and comparing.

The present invention may be implemented in an information-processing method performed by relay device 1 (an information-processing device), or in a program for causing a computer to function as relay device 1 (an information-processing device). The program may be distributed in the form of a recording medium such as an optical disc, or may be downloaded and installed to a computer via a network such as the Internet.

The present invention is described in detail in the foregoing; however, it is apparent to those skilled in the art that the present invention is not limited to the embodiments described in the present specification. The present invention may be implemented in modified or changed embodiments, without departing from the spirit and scope of the present invention defined by the description of the claims. The description in the present specification is for illustrative purposes and is not intended to limit the present invention in any way.

The invention claimed is:

1. An information-processing device comprising:
    an acquisition unit configured to acquire input data corresponding to spoken words input to a user terminal, and response data output from a plurality of dialog processing devices that perform processing according to the input data, each dialog processing device corresponding to a respective type of guidance for a set of the input data and the response data;
    a generation unit configured to determine the respective type of guidance based on the set of the input data and the response data; and to generate guidance information on how to use the one of the plurality of dialog processing devices corresponding to the determined respective type of guidance; and
    an output unit configured to determine whether guidance information corresponding to the determined respective type of guidance is necessary to be output to the user terminal, and upon determining that it is necessary to output the guidance information, output the guidance information generated by the generation unit to the user terminal.

2. The information-processing device according to claim 1, wherein the generation unit is configured to generate the guidance information on the basis of the response data, wherein the response data is data relating to an error.

3. The information-processing device according to claim 2, wherein the generation unit is configured to generate the guidance information on the basis of the input data, wherein the input data has a predetermined level of similarity to response data relating to an error, and does not trigger output of response data relating to the error.

4. The information-processing device according to claim 2, wherein the generation unit is configured, upon detecting that a predetermined number or more of items of the response data on the error has been output in response to the input data, to generate the guidance information on the basis of the response data relating to the error.

5. The information-processing device according to claim 1, wherein the generation unit is configured to generate the guidance information on the basis of a number of exchanges made after the spoken words are input to the user terminal until the corresponding one of the plurality of dialog processing devices performs the processing, wherein an exchange corresponds to a set of the input data and the response data.

6. The information-processing device according to claim 1, wherein:
    the generation unit is configured to generate the guidance information on the basis of input by the user of the user terminal or a group to which the user belongs; and
    the output unit is configured to output the guidance information that corresponds to the user of the user terminal or the group to which the user belongs, to the user terminal.

7. The information-processing device according to claim 1, wherein the output unit is further configured to specify whether the guidance information should be displayed or output as sound, based on content of the guidance information, and to output the guidance information to the user terminal, together with an instruction to output the guidance information using the specified output method.

8. The information-processing device according to claim 1, wherein the set of the input data and the response data is categorized as a type of processing performed in accordance with a voice instruction, or as a type of function activated by the voice instruction, and wherein the guidance information provides guidance for an example of the corresponding processing or function.

9. The information-processing device according to claim 1, wherein the determined respective type of guidance includes an order type in which the user places an order for a product or service, and wherein the guidance information generated based on the order type includes an example of a category name of the product or the service that can be ordered or bought by carrying out the corresponding processing or function.

10. The information-processing device according to claim 1, wherein the determined respective type of guidance includes an information provision type in which information is provided to the user, and wherein the guidance information generated based on the information provision type includes an example of a question required for the corresponding processing or function to provide information.

11. The information-processing device according to claim 1, wherein the determined respective type of guidance includes a home appliance control type in which the user's words spoken words correspond to a control instruction, and wherein the guidance information generated based on the home appliance control type includes an example of a name or a category name of an object to be controller by the corresponding processing or function.

12. The information-processing device according to claim 1, wherein a first respective type of guidance of a first dialog processing device of the plurality of dialog processing devices includes an order type in which the user places an order for a product or service, a second respective type of guidance of a second dialog processing device of the plurality of dialog processing devices includes an information provision type in which information is provided to the user, and a third respective type of guidance of a third dialog processing device of the plurality of dialog processing devices includes a home appliance control type in which the user's words spoken words correspond to a control instruction.

13. An information-processing method comprising:
  acquiring input data corresponding to spoken words input to a user terminal, and response data output from a plurality of dialog processing devices that perform processing according to the input data, each dialog processing device corresponding to a respective type of guidance for a set of the input data and the response data;
  determining the respective type of guidance based on the set of the input data and the response data;
  generating guidance information on how to use the one of the plurality of dialog processing devices corresponding to the determined respective type of guidance;
  determine whether guidance information corresponding to the determined respective type of guidance is necessary to be output to the user terminal; and
  upon determining that it is necessary to output the guidance information, outputting the guidance information generated by the generation unit to the user terminal.

14. The information-processing method according to claim 13, wherein the set of the input data and the response data is categorized as a type of processing performed in accordance with a voice instruction, or as a type of function activated by the voice instruction, and wherein the guidance information provides guidance for an example of the corresponding processing or function.

15. The information-processing method according to claim 13, wherein the determined respective type of guidance includes an order type in which the user places an order for a product or service, and wherein the guidance information generated based on the order type includes an example of a category name of the product or the service that can be ordered or bought by carrying out the corresponding processing or function.

16. The information-processing method according to claim 13, wherein the determined respective type of guidance includes an information provision type in which information is provided to the user, and wherein the guidance information generated based on the information provision type includes an example of a question required for the corresponding processing or function to provide information.

17. The information-processing method according claim 13, wherein the determined respective type of guidance includes a home appliance control type in which the user's words spoken words correspond to a control instruction, and wherein the guidance information generated based on the home appliance control type includes an example of a name or a category name of an object to be controller by the corresponding processing or function.

18. The information-processing method according to claim 13, wherein a first respective type of guidance of a first dialog processing device of the plurality of dialog processing devices includes an order type in which the user places an order for a product or service, a second respective type of guidance of a second dialog processing device of the plurality of dialog processing devices includes an information provision type in which information is provided to the user, and a third respective type of guidance of a third dialog processing device of the plurality of dialog processing devices includes a home appliance control type in which the user's words spoken words correspond to a control instruction.

\* \* \* \* \*